US012636604B2

(12) United States Patent (10) Patent No.: US 12,636,604 B2
Girondi (45) Date of Patent: May 26, 2026

(54) AIR FILTRATION ASSEMBLY

(71) Applicant: UFI INNOVATION CENTER S.R.L., Ala (IT)

(72) Inventor: Giorgio Girondi, Ala (IT)

(73) Assignee: UFI INNOVATION CENTER S.R.L. (IT)

( * ) Notice: Subject to any disclaimer, the term of this patent is extended or adjusted under 35 U.S.C. 154(b) by 344 days.

(21) Appl. No.: 18/294,130

(22) PCT Filed: Jul. 27, 2022

(86) PCT No.: PCT/IB2022/056927
§ 371 (c)(1),
(2) Date: Jan. 31, 2024

(87) PCT Pub. No.: WO2023/012598
PCT Pub. Date: Feb. 9, 2023

(65) Prior Publication Data
US 2024/0350961 A1 Oct. 24, 2024

(30) Foreign Application Priority Data
Aug. 2, 2021 (IT) ........................ 102021000020783

(51) Int. Cl.
*B01D 46/58* (2022.01)
*B01D 46/00* (2022.01)
(Continued)

(52) U.S. Cl.
CPC ......... *B01D 46/58* (2022.01); *B01D 46/0005* (2013.01); *B01D 46/2411* (2013.01);
(Continued)

(58) Field of Classification Search
CPC .. B01D 46/58; B01D 46/2411; B01D 46/005; F02M 35/02475; F02M 35/02416
See application file for complete search history.

(56) References Cited

U.S. PATENT DOCUMENTS

| 2014/0230384 A1 | 8/2014 | Girondi |
| 2016/0222928 A1 | 8/2016 | Girondi |
| (Continued) | | |

FOREIGN PATENT DOCUMENTS

| DE | 10032384 A1 | 1/2002 |
| EP | 0522245 A1 | 1/1993 |
| WO | 2013117988 A1 | 8/2013 |

OTHER PUBLICATIONS

International Search Report, issued in PCT/IB2022/056927, mailed Sep. 15, 2022, Rijswijk, NL.
Italian Search Report, Munich, Mar. 9, 2022.

*Primary Examiner* — Kevin Joyner
(74) *Attorney, Agent, or Firm* — Valauskas Corder LLC

(57) ABSTRACT

An air filtration assembly has a box having a wall extending along a first axis and a second axis and a filtering cartridge insertable into the box and having at least two tubular filtering partitions extending along a filter axis and a plate group extending with respect to an imaginary development plane and having a first face having at least one sealing profile and a second face having at least two abutment profiles. The box has an accommodation region accommodating the plate group. The at least one sealing profile and/or the at least two abutment profiles are shaped or mutually positioned with respect to the imaginary development plane having vertical and longitudinal variable distances therefrom. The at least two tubular filtering partitions define a main extension row along the first or second axis. Two tubular filtering partitions of a same row and proximal to each other have respective filter axes mutually offset along the first and second axes.

16 Claims, 10 Drawing Sheets

(51) Int. Cl.
     *B01D 46/24*           (2006.01)
     *F02M 35/02*          (2006.01)
     *F02M 35/024*       (2006.01)

(52) U.S. Cl.
     CPC ... *F02M 35/0204* (2013.01); *B01D 2265/028*
            (2013.01); *B01D 2271/022* (2013.01); *B01D*
                      *2279/60* (2013.01)

(56)             References Cited

U.S. PATENT DOCUMENTS

2017/0319998 A1    11/2017   Girondi et al.
2019/0111374 A1*   4/2019   Burton ............... B01D 46/0005

* cited by examiner

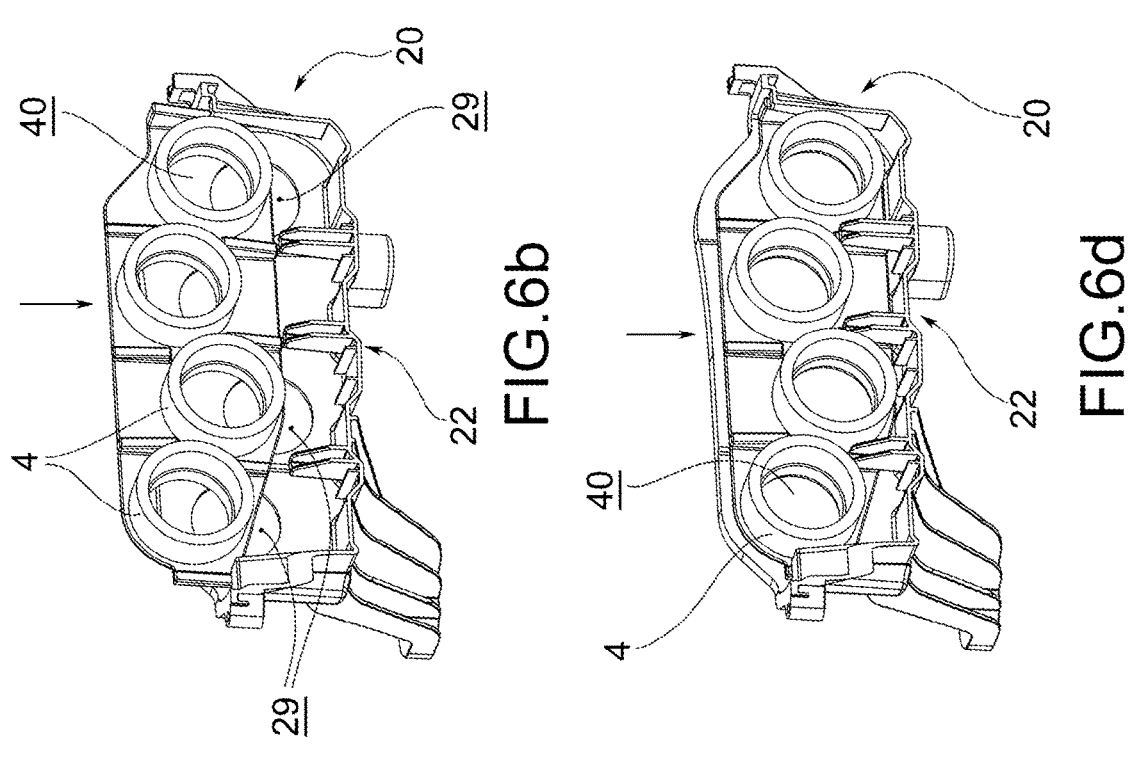
FIG.6b
FIG.6d
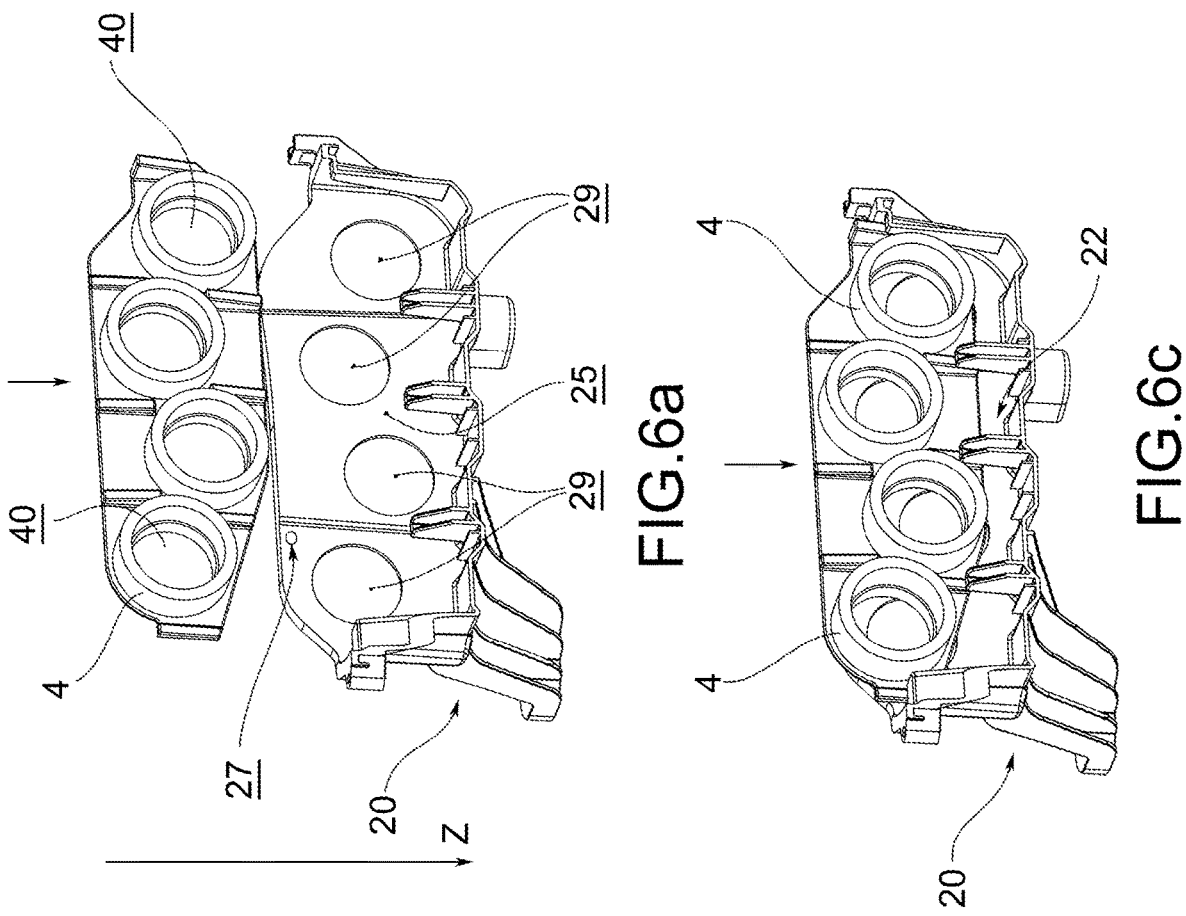
FIG.6a
FIG.6c

AIR FILTRATION ASSEMBLY

CROSS-REFERENCE TO RELATED APPLICATIONS

This application is a U.S. National Phase filing of PCT International Patent Application No. PCT/IB2022/056927, having an international filing date of Jul. 27, 2022, which claims priority to Italian Patent Application No. 102021000020783, filed Aug. 2, 2021 each of which is hereby incorporated by reference in its entirety.

FIELD OF THE INVENTION

The present invention relates to an air filtration assembly of a vehicle. Furthermore, the present invention also relates to an engine air supply system of a vehicle comprising the air filtration assembly of a vehicle.

The context to which the present invention pertains is that of air filtration assemblies in the automotive field. Specifically, it refers to the air filtration assemblies adapted to filter the air which is sucked in from the environment to be brought into the combustion chamber of the endothermic engine.

In particular, the purpose of such assemblies is to filter the air so as to eliminate suspended particles therefrom which, arriving in the combustion chamber, could damage the engine (or the components thereof) or cause ineffective combustion.

It is therefore essential that the air filtration is carried out effectively and efficiently, avoiding the possibility of a drawing and therefore avoiding the possibility of dirt reaching the combustion chamber.

BACKGROUND OF THE INVENTION

The known air filtration assemblies comprise specific boxes and specific filtering cartridges, typically panel elements, accommodated in said boxes.

The main problem of the known air filtration assemblies lies precisely in an incorrect operation of the filtering cartridge thereof, typically due to a failure to correctly position it inside the box.

Specifically, in fact, in the known solutions of the prior art, the problem linked to the incorrect positioning of the filtering cartridge is typical, which engages the box with an ineffective seal, thus having a drawing of air, with consequent inefficient filtration. Furthermore, incorrectly performing the operations to insert the filtering cartridge into the box involves potential damage to the filtering cartridge and/or the sealing profiles thereof, again causing ineffective air filtration.

In order to overcome this problem, multiple embodiments of air filtration assemblies have been implemented in the prior art in which the filtering cartridges and/or special components for accommodating the filtering cartridges, such as drawers, and/or the accommodation boxes of the filtering cartridges are subject to specific movements aimed at performing a correct positioning between the parts.

However, such solutions are found to be particularly complex and bulky. This entails the limited use thereof, not finding space in the engine compartment of the vehicle or generally occupying installation spaces which are potentially useful for other components necessary for the operation of the vehicle.

SUMMARY OF THE INVENTION

The need is therefore strongly felt to provide an air filtration assembly which has a box and a filtering cartridge which can be accommodated in said box, in which the filtering cartridge has efficient filtering properties, and is simultaneously insertable into the box in a simple and intuitive manner, but above all correctly, preventing the possible incorrect positioning thereof and thus any undesired drawing or breakage. At the same time, said air filtration assembly must also have the smallest possible dimensions while maintaining said filtering efficiency.

It is precisely the object of the present invention to provide an air filtration assembly in which the aforesaid requirements are fulfilled.

Such an object is achieved by the air filtration assembly and an engine air supply system of a vehicle comprising the filtration assembly as described and claimed herein.

Preferred variants implying further advantageous aspects are also described.

DESCRIPTION OF THE DRAWINGS

Further features and advantages of the invention will become apparent from the description provided below of preferred exemplary embodiments thereof, given by way of non-limiting example, with reference to the accompanying drawings, in which:

FIGS. 6*a*, 6*b*, 6*c*, 6*d*, 6*e*, 6*f*, 6*g* and 6*h* show longitudinal sections of the air filtration assembly, in different assembly steps;

DETAILED DESCRIPTION

Figures 1A, 1B, 1C, 1D:
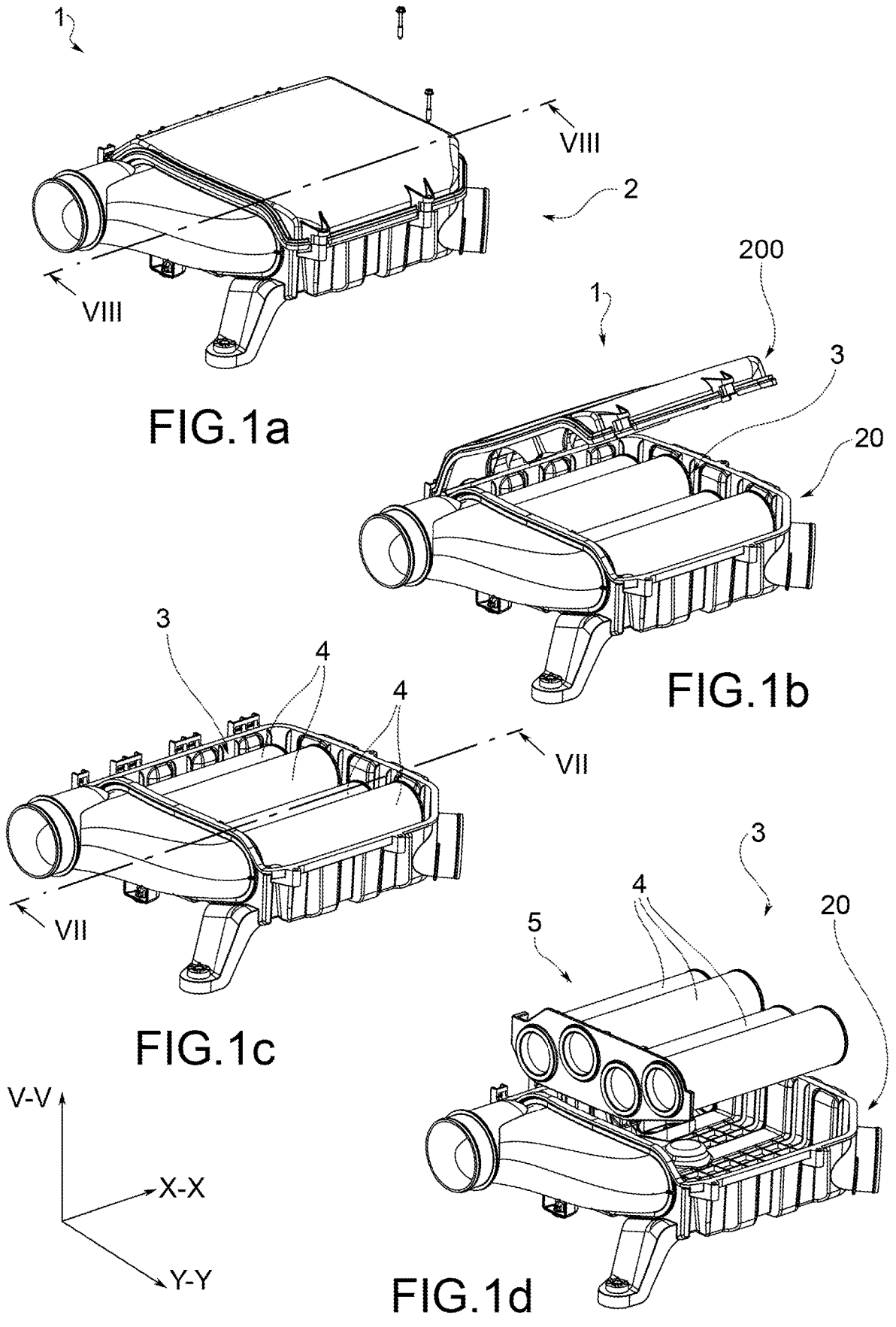
FIGS. 1*a*, 1*b*, 1*c* and 1*d* show, in perspective, some disassembly steps of the air filtration assembly according to the present invention, in accordance with a preferred embodiment.
Figures 2, 2A, 2B:
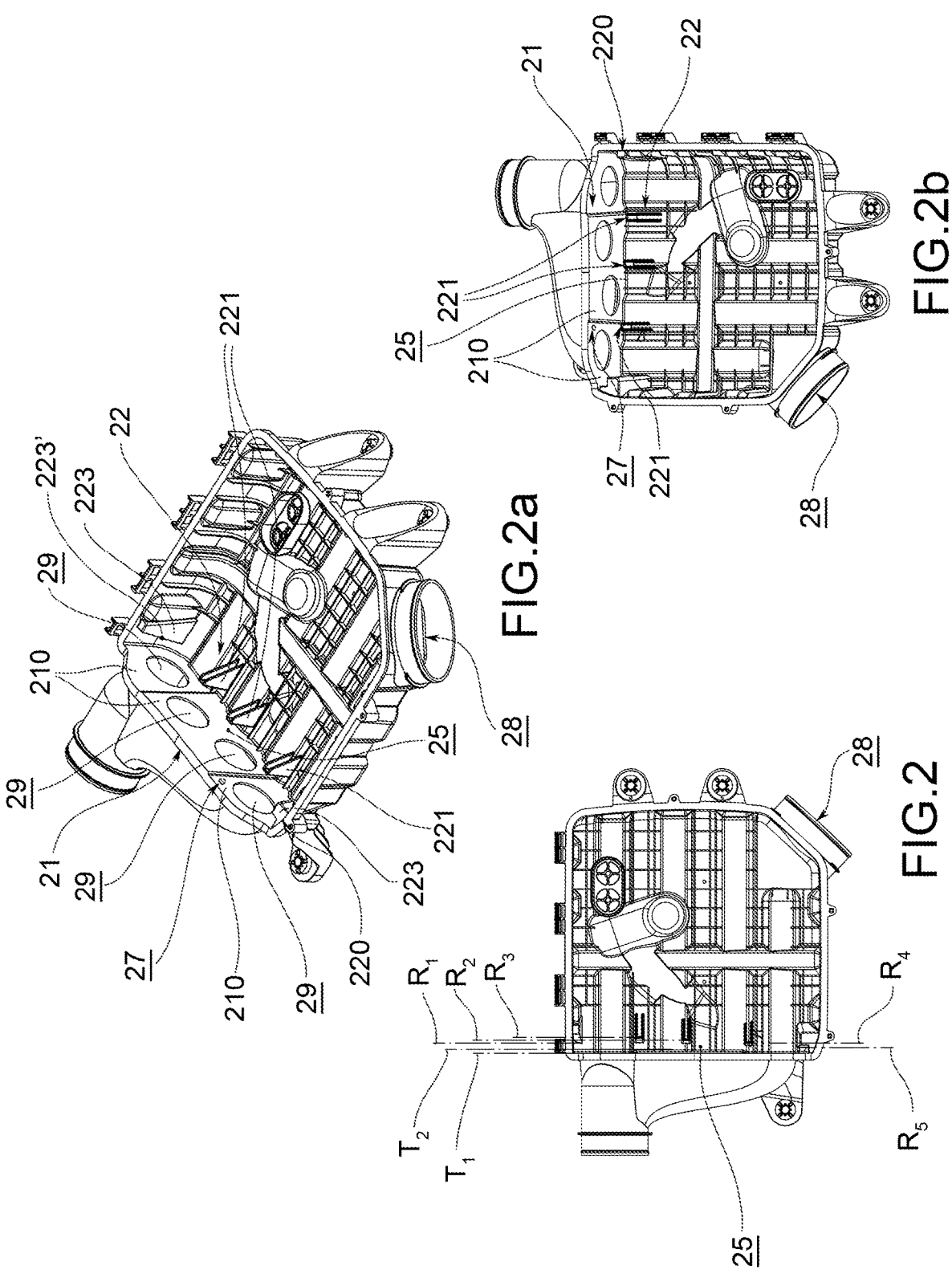
FIGS. 2, 2*a* and 2*b* show a container comprised in the air filtration assembly of the present invention in a top view and in two perspective views, respectively.
Figure 3A:
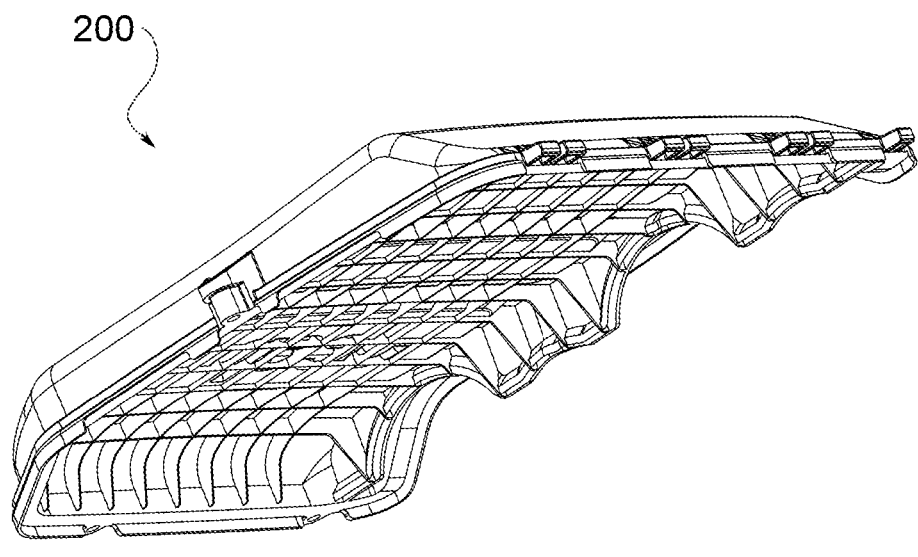
FIG. 3*a* e 3*b* show a lid comprised in the air filtration assembly of the present invention, respectively in two perspective views.
Figure 3B:
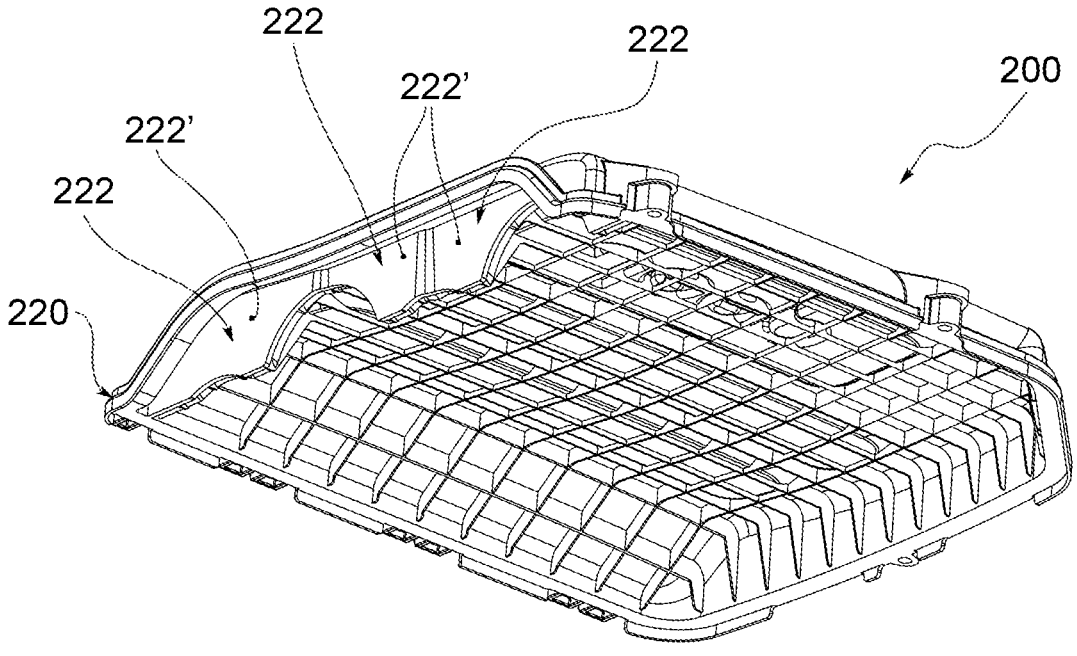
Figures 4A, 4B:
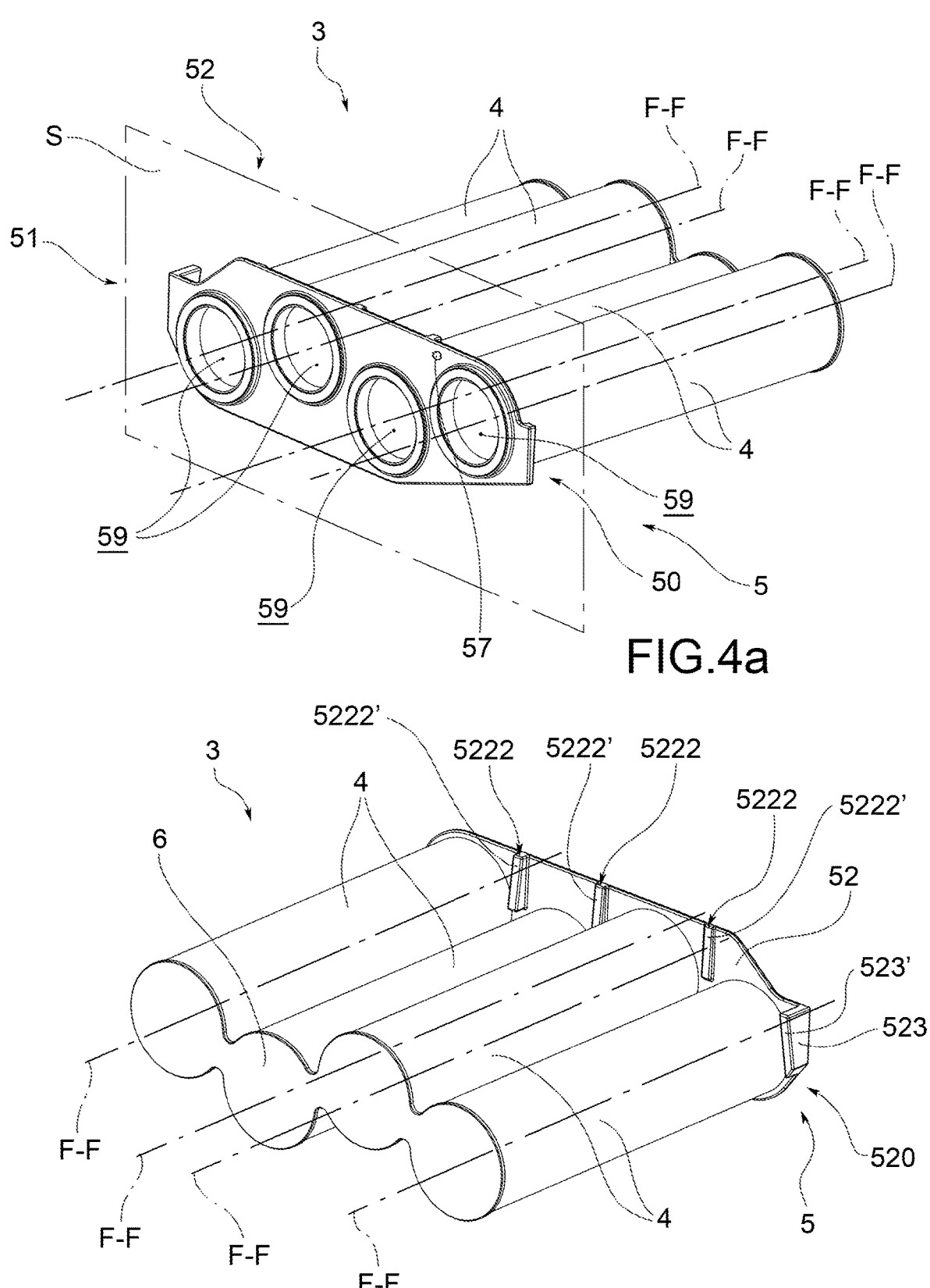
FIGS. 4*a* and 4*b* show a filtering cartridge comprised in the air filtration assembly of the present invention, respectively in two perspective views.
Figures 5, 5A:
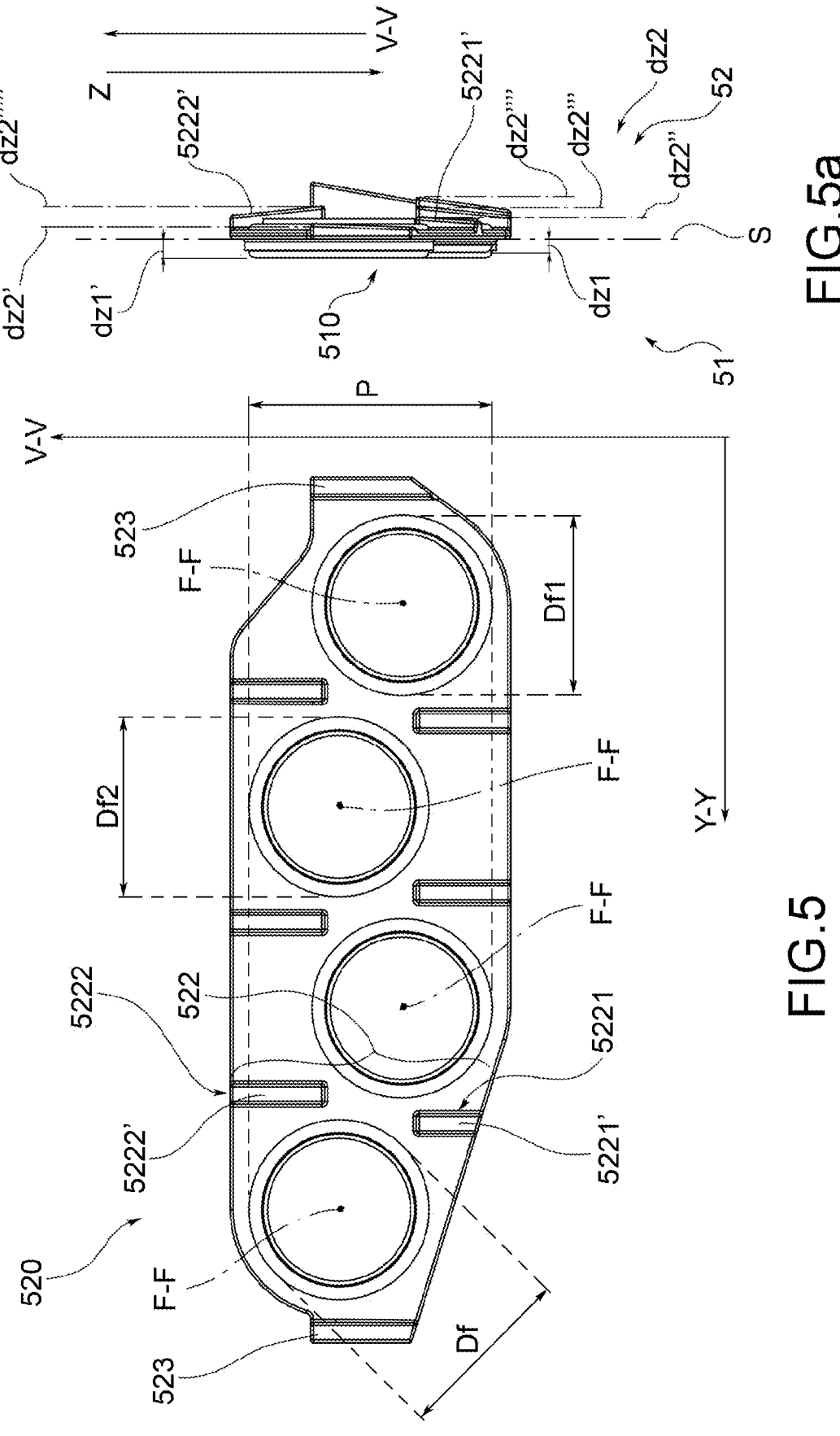
FIGS. 5, 5*a*, 5*b* and 5*c* show a front view, a side view and a top view and a bottom view of a plate group comprised in the filtering cartridge according to a preferred embodiment.
Figure 5B:
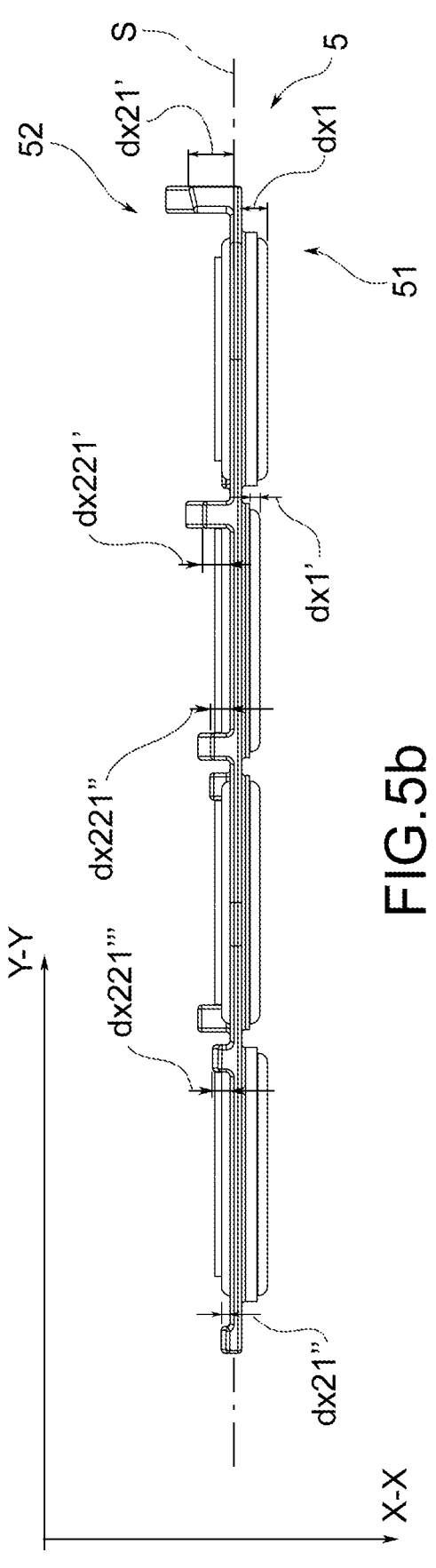
Figure 5C:
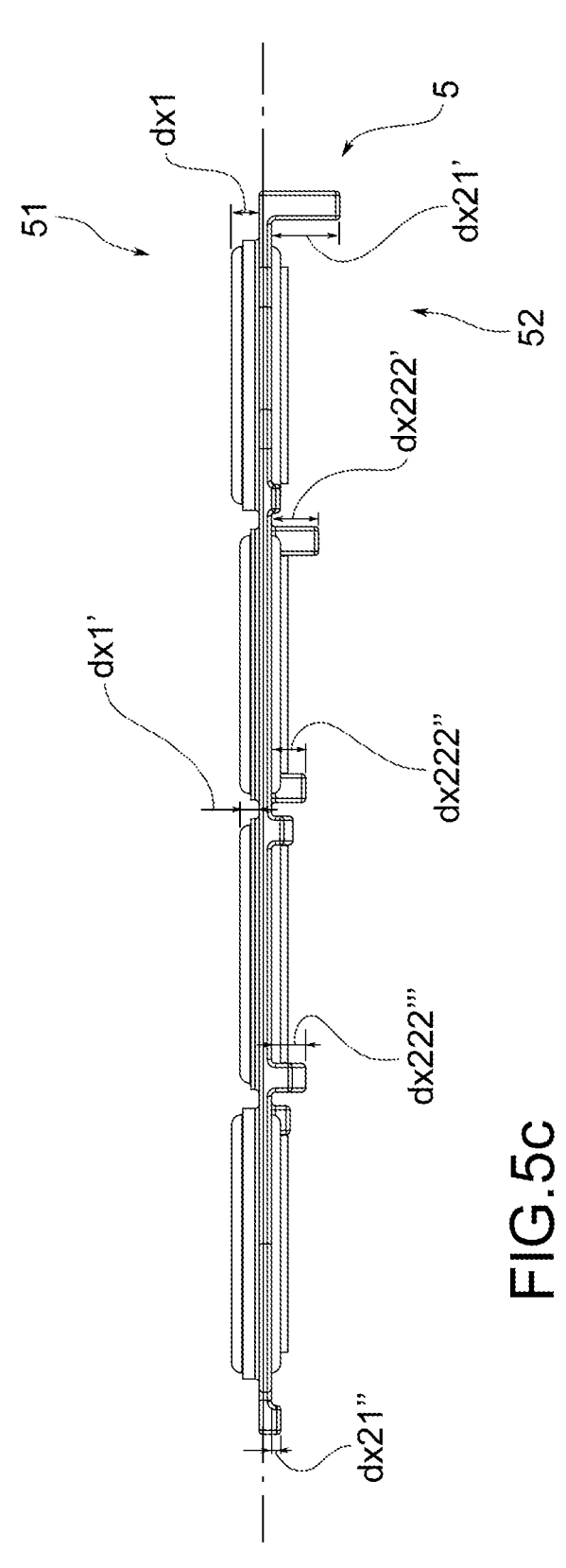
Figures 6E, 6F, 6G, 6H:
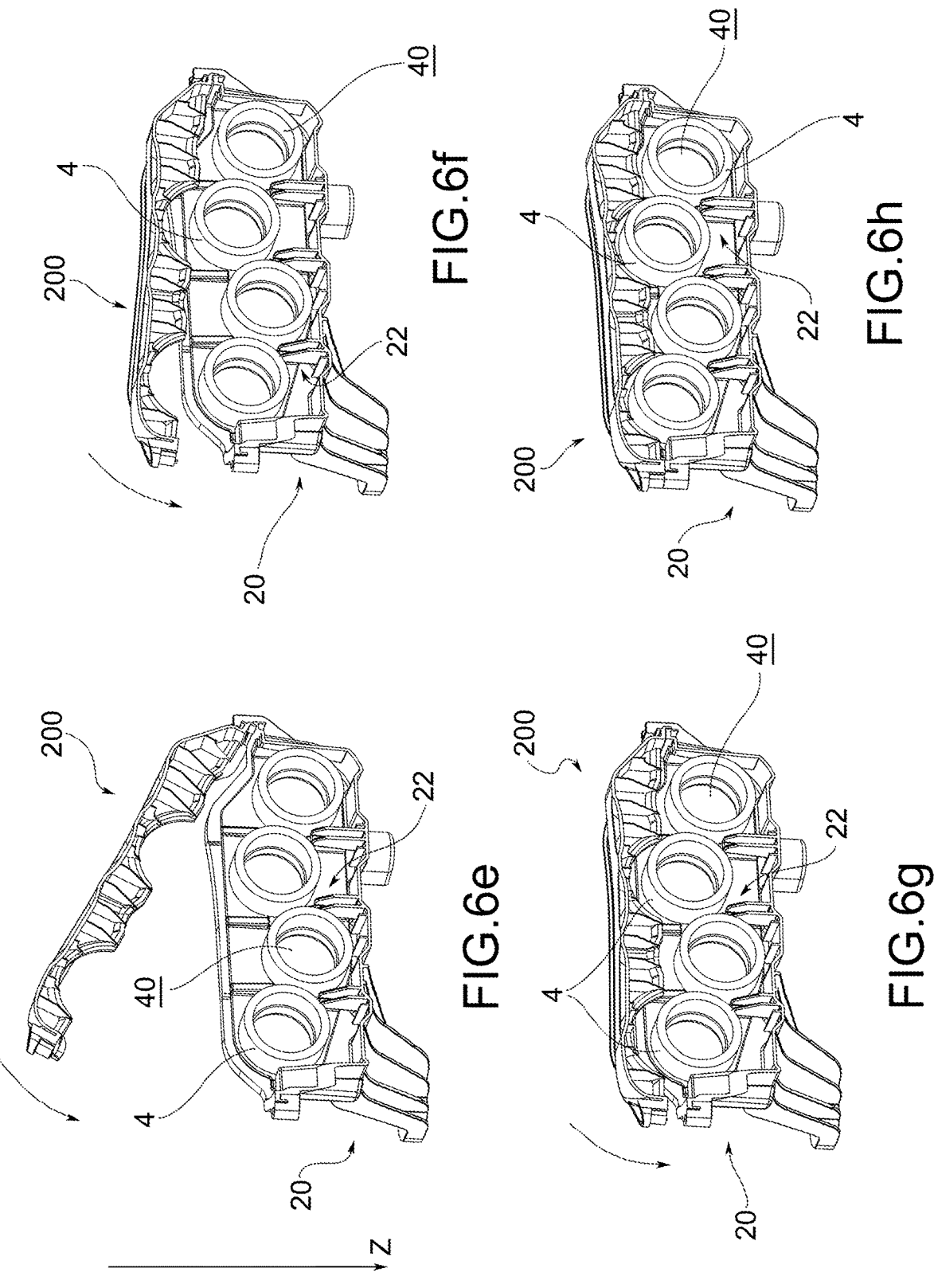
Figure 7:
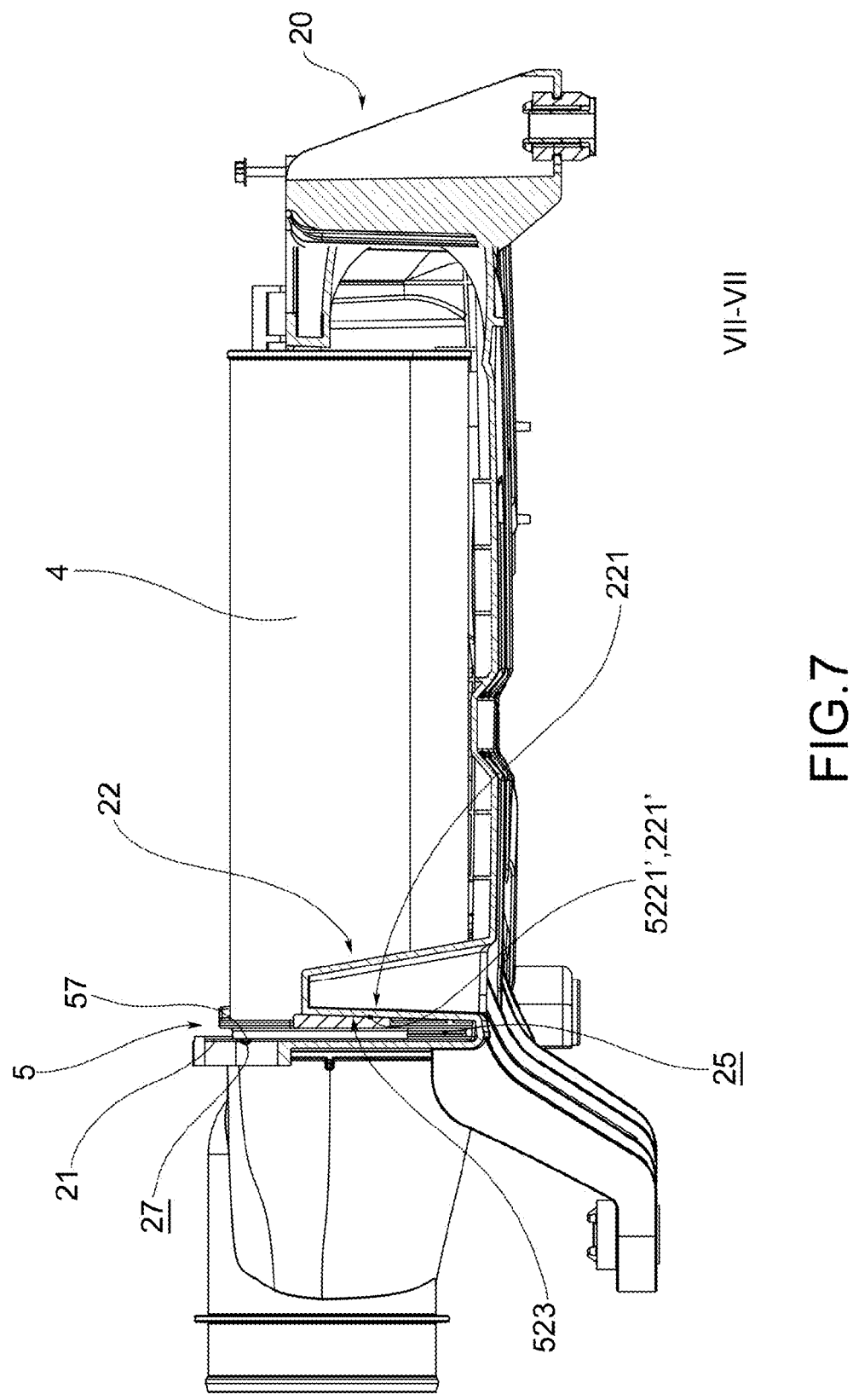
FIG. 7 is a longitudinal sectional view along a first section plane obtained in FIG. 1*c*.
Figure 8:
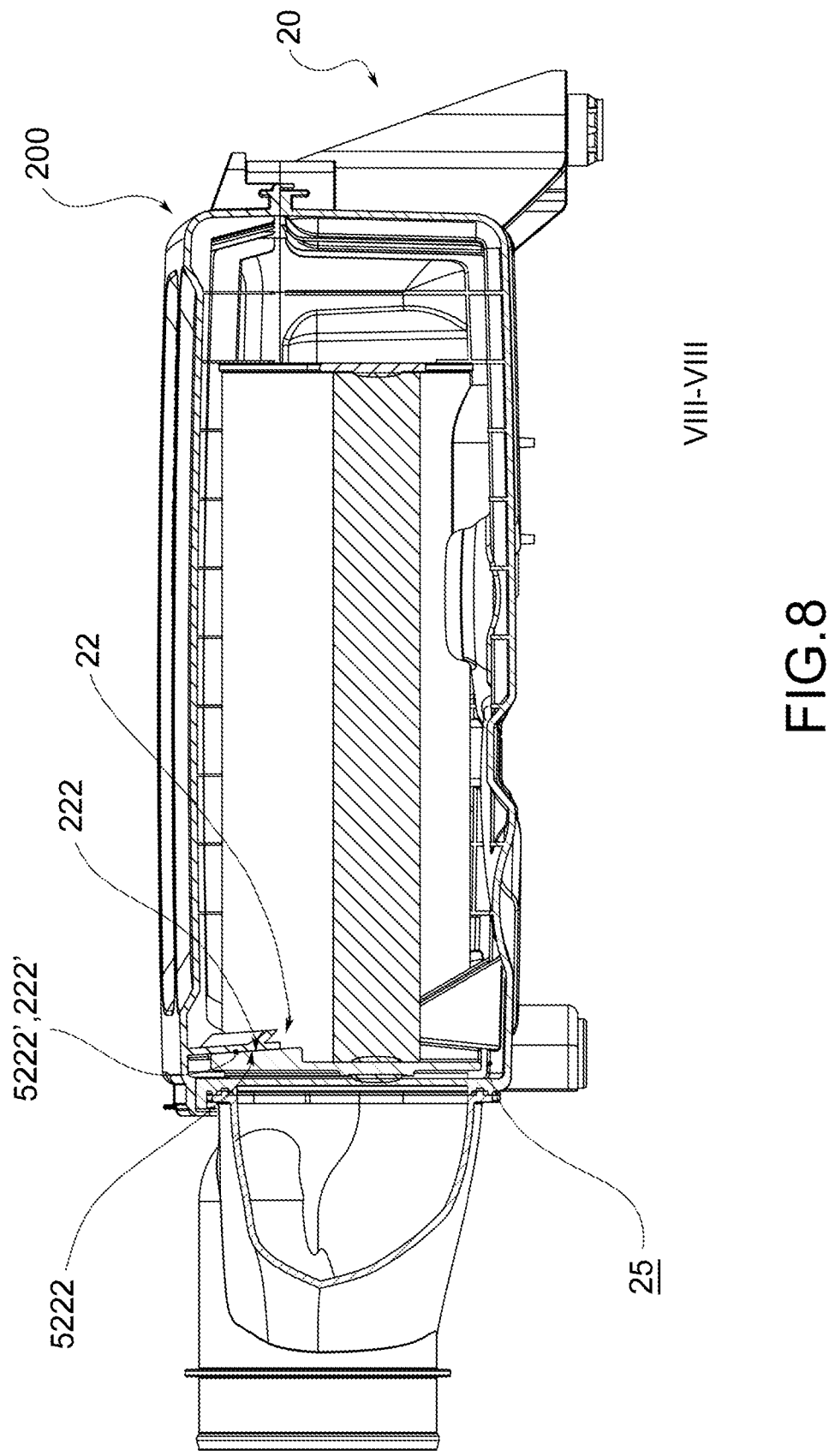
FIG. 8 is a longitudinal sectional view along a second section plane obtained in FIG. 1*a*.

In the accompanying figures, reference numeral 1 indicates an air filtration assembly in accordance with the present invention.

In accordance with the present invention, the air filtration assembly 1 is adapted to be part of a vehicle. In particular, the air filtration assembly 1 is adapted to be part of the engine air supply system of a vehicle. Preferably, the air filtration assembly 1 is connectable to an air intake manifold of a vehicle. Preferably, the air filtration assembly 1 is fluidly connectable to the combustion chamber of a combustion engine of a vehicle by means of said air intake manifold.

Preferably, the air filtration assembly 1 is crossable in suction by the ambient air. Inside the air filtration assembly 1, the ambient air is thus separated from the unwanted elements suspended therein.

As mentioned, the present invention also relates to the engine air supply system of a vehicle which comprises the air filtration assembly 1.

According to the present invention, the air filtration assembly 1 of a vehicle comprises a box 2 and a filtering cartridge 3 accommodated in said box 2.

Preferably, said box 2 is fluidly connectable on one side to the external environment and on the other side to an air intake manifold of the vehicle.

The air filtration occurs inside the box 2.

In accordance with the present invention, the box 2 comprises a wall 21. Preferably, said wall 21 comprises at least one outflow mouth 29 which is crossable by the air. Preferably, the filtered air exits the box 2 from the outflow mouth 29. Preferably, the outflow mouth 29 is fluidly connectable to the air intake manifold.

In accordance with the invention, the box 2 extends along a first axis V-V, preferably vertical, and a second axis Y-Y, preferably transverse. In accordance with a preferred embodiment, the first axis V-V is orthogonal to the second axis Y-Y.

Preferably, the wall 21 extends along said first axis V-V and said second axis Y-Y.

In accordance with the present invention, the box 2 extends along a longitudinal axis X-X as well. The longitudinal axis X-X is incident to the first axis V-V and to the second axis Y-Y. In other words, the longitudinal axis X-X extends from the wall 21. Preferably, the longitudinal axis X-X extends orthogonally with respect to the first axis V-V and the second axis Y-Y, therefore, preferably, the longitudinal axis X-X is orthogonal to the wall 21.

According to a preferred embodiment, the box 2 substantially has the shape of a parallelepiped. Preferably, the box 2 or specific portions thereof has a curved or arched shape.

In accordance with a preferred embodiment, the filtering cartridge 3 comprises a plurality of tubular filtering partitions 4 and a plate group 5, to which said tubular filtering partitions 4 are integrally connected.

In accordance with the present invention, the filtering cartridge 3 comprises at least two tubular filtering partitions 4 which are crossable, preferably radially, in filtration. Preferably, the tubular filtering partitions 4 are radially crossable in filtration from the outside to the inside, so as to identify the dirty side of the filtering cartridge 3 outside the tubular filtering partitions 4 and the clean side of the filtering cartridge 3 therein, preferably in the inner cavities 40 of the tubular filtering partitions 4.

In accordance with the present invention, each tubular filtering partition 4 extends along a filter axis F-F substantially parallel to the longitudinal axis X-X.

In accordance with the present invention, the filtering cartridge 3 comprises at least two tubular filtering partitions 4 positioned defining a main extension row along the first axis V-V or the second axis Y-Y.

In accordance with the present invention, two tubular filtering partitions 4 belonging to the same row and proximal to each other have the respective filter axes F-F mutually offset, along both the first axis V-V and the second axis Y-Y.

According to a preferred embodiment, each tubular filtering partition 4 has a filter diameter Df, Df1, Df2. In particular, the filter diameter refers to the outer diameter of the tubular filtering partition 4.

In accordance with a preferred embodiment, the two tubular filtering partitions 4 belonging to the same row and proximal to each other have the respective filter axes F-F mutually offset along both the first axis V-V and the second axis Y-Y and define a projection P on the first axis V-V and/or on the second axis Y-Y which is less than the sum of the respective filter diameters.

In accordance with a preferred embodiment, the two tubular filtering partitions 4 belonging to the same row and proximal to each other have the respective filter axes F-F mutually offset along both the first axis V-V and the second axis Y-Y and define a projection P on the first axis V-V and/or on the second axis Y-Y which is equal to the sum of the respective filter diameters.

In accordance with a preferred embodiment, the tubular filtering partitions 4 substantially all have the same diameter Df. In other words, the diameter of a first tubular filtering partition Df1 is substantially equal to the diameter of a second tubular filtering partition Df2.

According to a preferred embodiment, the filtering cartridge 3 comprises at least two tubular filtering partitions 4.

Preferably, the filtering cartridge 3 comprises at least three tubular filtering partitions 4.

In accordance with a preferred embodiment, the filtering cartridge 3 comprises at least a third tubular filtering partition 4 belonging to the same row of the two tubular filtering partitions 4 proximal to each other and with the respective filter axes F-F mutually offset along both the first axis V-V and along the second axis Y-Y.

Preferably, the filter axis F-F of said third tubular filtering partition 4 is mutually aligned with the filter axis F-F of one of the two tubular filtering partitions 4 belonging to the same row and proximal to each other. Preferably, the filter axis F-F of said third tubular filtering partition 4 is aligned with the filter axis F-F of one of the two tubular filtering partitions 4 belonging to the same row and proximal to each other along the first axis V-V or the second axis Y-Y, in particular along the axis incident to the insertion direction Z.

In accordance with a preferred embodiment, the filter axis F-F of said third tubular filtering partition 4 is mutually offset with respect to the filter axes F-F of both tubular filtering partitions 4 belonging to the same row and proximal to each other along both the first axis V-V and the second axis Y-Y.

In accordance with a preferred embodiment, according to the preferential arrangement of the tubular filtering partitions 4, one or more rows of tubular filtering partitions 4 are identified.

According to the present description, the row extends in a main direction along the first axis V-V or the second axis Y-Y, preferably in a direction orthogonal to the insertion direction Z.

For example, in the embodiment of the accompanying drawings, a row of tubular filtering partitions 4 is identified mainly extending along the axis Y-Y.

Preferred embodiments are included in which the tubular filtering partitions 4 are at least four.

Preferred embodiments are included in which the tubular filtering partitions extend over several rows.

In accordance with a preferred embodiment, the filtering cartridge 3 comprises a plurality of rows, in which each row comprises at least two tubular filtering partitions 4 and extends in a main direction along the first axis V-V or the second axis Y-Y, preferably in a direction orthogonal to the insertion direction Z. Preferably, the two tubular filtering partitions 4 of the belonging to the same row and proximal to each other have the respective filter axes F-F mutually offset along both the first axis V-V and the second axis Y-Y and define a projection P on the first axis V-V and/or on the second axis Y-Y lower than the sum of the respective filter diameters.

According to a preferred embodiment, the filtering cartridge 3 comprises two rows of tubular filtering partitions 4 which extend along the same main direction, preferably in a direction orthogonal to the insertion direction Z.

According to a preferred embodiment, the filtering cartridge 3 comprises two rows of tubular filtering partitions 4 which extend along different directions.

As said, in accordance with the present invention, furthermore, the filtering cartridge 3 also comprises a plate group 5 to which the tubular filtering partitions 4 are operatively connected. In particular, the plate group 5 is adapted to support the tubular filtering partitions 4.

The plate group 5 comprises at least one outflow opening 59 adapted to put the tubular filtering partitions 4, in particular the inner cavity 40 thereof, in fluid communication with the at least one outflow mouth 29.

According to a preferred embodiment, the plate group 5 comprises at least one outflow opening 59 for each tubular filtering partition 4. Preferably, the wall 21 also comprises an outflow mouth 29 at each outflow opening 59.

In other words, according to a preferred embodiment, the outflow opening 59 is a duct extending longitudinally between the second face 52 and the first face 51 of the plate group 5. Preferably, the plate group 5 comprises a number of ducts equal to the number of tubular filtering partitions 4.

In accordance with an alternative embodiment, the at least one outflow opening 59 has a shape such as to extend longitudinally between the second face 52 and the first face 51 to fluidly connect the tubular filtering partitions 4 to the at least one outflow mouth 29. In other words, in such an embodiment, the outflow opening 59 is an inner fluid manifold adapted to connect the tubular filtering partitions 4 with the at least one outflow mouth 29. Preferably, therefore, the outflow opening 59 has a number of fluid passages on the second face 52 equal to the number of tubular filtering partitions 4 and a plurality of fluid passages on the first face 51, for example comprising a number of fluid passages on the first face 51 equal to the number of outflow mouths 29 present in the wall 21.

According to the present invention, the plate group 5 extends with respect to an imaginary development plane S.

Preferably, said imaginary development plane S is positioned at the center line of the thickness of the plate group 5.

Preferably, the plate group 5 comprises a plate body 50. According to a preferred embodiment, the plate body 50 is obtained by means of a plastic molding operation, such as injection molding.

In accordance with the present invention, on the opposite sides of said imaginary development plane S, the plate group 5 comprises a first face 51 and a second face 52. The first face 51 is also called the sealing face. The second face 52 is also called the abutment or thrust face.

In accordance with a preferred embodiment, the at least two tubular filtering partitions 4 are operatively connected to the plate body 50 of the plate group 5.

According to a preferred embodiment, the at least two tubular filtering partitions 4 are integrally connected to the plate group 5.

Preferably, in accordance with a preferred embodiment, the at least two tubular filtering partitions 4 are integrally connected to the second face 52.

According to the present invention, the first face 51 comprises at least one sealing profile 510.

According to a preferred embodiment, the plate group 5 comprises a single sealing profile 510 extending around the outflow opening 59 or the outflow openings present in the plate group 5, identifying a single sealing region through the engagement with the wall 21.

In accordance with a preferred embodiment, for each outflow opening 59, the plate group 5 comprises a respective sealing profile 510 extending around the respective outflow opening 59. In other words, for example, embodiments of the filtering cartridge 3 in which the plate group 5 comprises three outflow openings 59 comprise three sealing profiles 510 identifying three sealing regions.

In some embodiments, the plate group 5 comprises sealing profiles 510 extending around a plurality of outflow openings 59. For example, a sealing profile 510 extends around a plurality of outflow openings 59, preferably mutually aligned.

According to a preferred embodiment, each sealing profile 510 is an elastically yielding element.

In accordance with a preferred embodiment, the sealing profile 510 is a removable element, for example which can be accommodated in a specially shaped seat, comprised in the plate body 50. Preferably, as shown in the accompanying drawings, the sealing profile 510 is a gasket member.

According to further preferred embodiments, the sealing profile 510 is integrated in the plate body 50. In particular, the sealing profile 510 is a sealing collar or lip integrally formed with the plate body 50, for example in the same material as the plate body 50.

According to further preferred embodiments, the sealing profile 510 is integrated in the plate body by over-molding.

Preferably, the sealing profile 510 is made of a fibrous material such as anon-woven fabric.

Preferably, the sealing profile 510 acts in an axial direction (in a direction parallel to the longitudinal direction X-X).

Preferably, in the case of several sealing profiles 510, each sealing profile 510 acts in an axial direction (in a direction parallel to the longitudinal direction X-X).

According to the present invention, the second face 52 comprises at least two abutment profiles 520.

Preferably, said abutment profiles 520 are orthogonally projecting elements, with respect to the imaginary development plane S, positioned axially and mutually spaced apart. That is to say that the abutment profiles 520 extend in height orthogonally to the insertion direction, i.e., in the longitudinal direction X-X, and are mutually and axially spaced apart with respect to the first axis V-V or with respect to the second axis Y-Y, preferably with respect to the second axis Y-Y, i.e., with respect to the axis orthogonal to the insertion direction Z.

According to the present invention, the abutment profiles 520 are mutually spaced apart with respect to the first axis V-V or with respect to the second axis Y-Y so that at least one tubular filtering partition 4 is positioned between two consecutive abutment profiles 520 (along the first axis V-V or the second Y-Y axis).

In accordance with a preferred embodiment, the abutment profiles 520 are in a number such as to comprise end abutment profiles 523, axially distal, and at least one central abutment profile 522 positioned between the two end abutment profiles 523.

Preferably, a central abutment profile 522 is positioned between two proximal tubular filtering partitions 4.

Preferably, the plate group 5 comprises a central abutment profile 522 between each pair of proximal tubular filtering partitions 4.

In the embodiments comprising three tubular filtering partitions 4, two end abutment profiles 523 and two central abutment profiles 522 are identified, so that a central abutment profile 522 is positioned between the first and second tubular filtering partitions 4, and the other central abutment profile 522 is positioned between the second and third tubular filtering partitions 4.

In accordance with a preferred embodiment, the central abutment profile 522 comprises a first portion 5221 and a second portion 5222.

In accordance with a preferred embodiment, the central abutment profile 522 comprises a first portion 5221 and a second portion 5222 mutually spaced apart along the insertion direction Z.

In accordance with a preferred embodiment, the central abutment profile 522 comprises a first portion 5221 and a second portion 5222 which are mutually separated.

Preferably, the first portion 5221 and the second portion 5222 are mutually separated along the insertion direction Z. Preferably, in the insertion of the filtering cartridge 3 into the box 2 firstly the first portion 5221 is engaged and then the second portion 5222 is engaged.

According to a preferred embodiment, the first portion 5221 and the second portion 5222 are positioned so as to be mutually offset along the first axis V-V or the second axis Y-Y, in particular along the axis incident to the insertion direction Z.

According to the present invention, the filtering cartridge 3 is insertable into the box 2 along an insertion direction Z substantially parallel to the first axis V-V or the second axis Y-Y.

In other words, the filtering cartridge 3 is insertable into the box 2 with an insertion operation in a single insertion direction.

In accordance with a preferred embodiment, the insertion direction Z is substantially the first axis V-V corresponding to the vertical direction, so that the insertion operation also benefits from the action of the force of gravity.

In accordance with the present invention, the box 2 comprises an accommodation region 25 between the wall 21 and at least two abutment elements 22 longitudinally spaced apart from the wall 21 and mutually axially spaced apart.

The plate group 5 is accommodated in said accommodation region 25 with the at least one sealing profile 510 sealingly engaged with the wall 21 and the abutment profiles 520 engaged with the respective abutment elements 22.

Preferably, the abutment elements 22 comprised in the box 2 are in number and position as a function of the abutment profiles 520 comprised on the plate group 5.

In other words, in said accommodation region 25, the plate group 5 is insertable by an axial insertion operation along the insertion direction Z so that the plate group 5 sealingly engages the wall 21 with the first face 51 and so that it is engaged by the abutment elements 22 on the second face 52. Preferably, the abutment on the second face 52 involves an axial thrust, in the longitudinal direction, such as to thrust and keep the first face 51 in a thrust action on the wall 21.

In accordance with a preferred embodiment, the box 2 comprises a container 20, in which the filtering cartridge 3 can be accommodated at least in part and a lid 200 adapted to engage and close the container 20.

Preferably, the accommodation region 25 is closed on one side by the container 20 and on the other side by the lid 200.

According to a preferred embodiment, one or more abutment profiles 520, preferably at least the central abutment profile 522 (or the central abutment profiles, if present), are engaged by both the container 20 and the lid 200.

In accordance with a preferred embodiment, the first portion 5221 is engaged by the container 20 and the second portion 5222 is engaged by the lid 200.

In accordance with a preferred embodiment, the central abutment element 220 comprises a container abutment half-element 221 adapted to engage the first portion 5221 and a lid abutment half-element 222 adapted to engage the second portion 5222. In other words, the container abutment half-element 221 is accommodated on the container 20 while the lid abutment half-element 222 is accommodated on the lid 200.

As fully described below, the plate group 5 (in particular some of the components thereof) and, complementarily, the accommodation region 25 are mutually specially shaped in both a longitudinal direction and in a direction parallel to the insertion direction. In particular, therefore, such a coupling allows a single/unique mutual positioning.

According to a preferred embodiment, in accordance with the present invention, the at least one sealing profile 510 is shaped with respect to the imaginary development plane S having variable vertical distances dz1, dz1' measured in a direction orthogonal to the insertion direction Z, along said insertion direction Z.

That is to say that the sealing profile 510 is shaped so as to have specific portions at a first vertical distance dz1 from the imaginary development plane S and other portions at a different vertical distance dz1' from the imaginary development plane S.

Or according to a preferred embodiment, in accordance with the present invention, the sealing profiles 510 are mutually positioned with respect to the imaginary development plane S having variable vertical distances dz1, dz1' measured in a direction orthogonal to the insertion direction Z, along said insertion direction Z.

That is to say that comprising a plurality of sealing profiles 510, each sealing profile 510 is positioned so as to be at a specific vertical distance from the imaginary development plane S. Preferably, therefore, two consecutive sealing profiles 510, in the direction parallel to the insertion direction Z, are located at two different distances from said imaginary development plane S. Preferably, the lower sealing profiles 510 or the lower portions of the sealing profiles 510 which in the insertion operations are the first to access the box 2 are located in a position preferably proximal to the imaginary development plane S with respect to the upper sealing profiles 510 or to the upper portions of the sealing profiles 510.

In accordance with what has been described above in relation to the shape and position of the sealing profiles 510, the wall 21 is specially, complementarily, shaped.

In accordance with a preferred embodiment, in accordance with the present invention, the abutment profiles 520 are shaped with respect to the imaginary development plane S having variable vertical distances dz2, dz2' measured in a direction orthogonal to the insertion direction Z, along said insertion direction Z.

That is to say that the abutment profile 520 is shaped so as to have specific portions at a first vertical distance dz2 from the imaginary development plane S and other portions at a different vertical distance dz2', dz2", dz2'", dz2" ', dz2"" from the imaginary development plane S.

Furthermore, in accordance with a preferred embodiment of the present invention, the abutment profiles 520 are mutually positioned with respect to the imaginary development plane S having variable vertical distances dz2', dz2", dz2'", dz2"", dz2""" measured in a direction orthogonal to the insertion direction Z, along said insertion direction Z. In other words, the abutment profiles have a "serrated profile".

In accordance with what has been described above in relation to the shape and position of the abutment profiles 520, the abutment elements 22 are specially, complementarily, shaped.

According to a preferred embodiment, the abutment profiles 520 and the abutment elements 22 comprise respective abutment and thrust surfaces 523', 223', 5221', 221', 5222', 222' mutually slidingly engageable in the insertion operations of the cartridge 3 into the box 2.

Preferably, the abutment and thrust surfaces are shaped so that the cartridge 3 is thrust in the longitudinal direction, and is kept in position, towards the wall 21.

In other words, according to the present invention, the plate group 5, sectioned orthogonally with respect to the development plane S, has elements, or portions of elements, proximal to said development plane S and elements, or portions of elements, distal from said development plane S. In other words, according to the present invention, the plate group 5 sectioned orthogonally with respect to the development plane S has, on the first face 51 and/or the second face 52, elements, or portions of elements, proximal to said imaginary development plane S and elements, or portions of elements, distal from said imaginary development plane S.

According to the present invention, the plate group 5 has a shape such as to be tapered in the first region which enters, during the insertion operations, in the accommodation region 25. According to a preferred embodiment, the plate group has a shape such as to be tapered at the bottom.

According to a preferred embodiment, in accordance with the present invention, the at least one sealing profile 510 is shaped with respect to the imaginary development plane S having variable longitudinal distances dx1, dx1' measured in a direction parallel to the longitudinal axis X-X, along the first axis V-V or the second axis Y-Y, preferably, along the axis orthogonal to the insertion direction Z.

That is to say that the sealing profile 510 is shaped so as to have specific portions at a first longitudinal distance dx1 from the imaginary development plane S and other portions at a different longitudinal distance dx1' from the imaginary development plane S.

Or according to a preferred embodiment, in accordance with the present invention, the sealing profiles 510 are mutually positioned with respect to the imaginary development plane S having variable longitudinal distances dx1, dx1' measured in a direction parallel to the longitudinal axis X-X, along the first axis V-V or the second axis Y-Y, preferably, along the axis orthogonal to the insertion direction Z.

That is to say that comprising a plurality of sealing profiles 510, each sealing profile 510 is positioned so as to be at a specific longitudinal distance from the imaginary development plane S. Preferably, therefore, two mutually consecutive sealing profiles 510 are located at two different longitudinal distances from the imaginary development plane S.

According to a preferred embodiment, in accordance with the present invention, the abutment profiles 520 are shaped with respect to the imaginary development plane S having variable longitudinal distances dx21', dx21", dx221', dx222', dx221", dx222", dx221''', dx222''' measured in a direction parallel to the longitudinal axis X-X, along the first axis V-V or the second axis Y-Y, preferably, along the axis orthogonal to the insertion direction Z.

That is to say that the abutment profile 520 is shaped so as to have specific portions at a first longitudinal distance from the imaginary development plane S and other portions at a different longitudinal distance from the imaginary development plane S.

Or according to a preferred embodiment, in accordance with the present invention, the abutment profiles 520 are mutually positioned with respect to the imaginary development plane S having variable longitudinal distances dx21', dx21", dx221', dx222', dx221", dx222", dx221''', dx222''' measured in a direction parallel to the longitudinal axis X-X, along the first axis V-V or the second axis Y-Y, preferably, along the axis orthogonal to the insertion direction Z.

That is to say that by comprising a plurality of abutment profiles 520, each abutment profile 520 is positioned so as to be at a specific longitudinal distance from the imaginary development plane S. Preferably, therefore, two mutually consecutive abutment profiles 520 along the insertion axis Z are located at two different longitudinal distances from the imaginary development plane S.

In other words, according to the present invention, the plate group 5 sectioned along the development plane S, has elements, or portions of elements, longitudinally proximal to said plane and elements, or portions of elements, longitudinally distal from said plane. In other words, according to the present invention, the plate group 5 sectioned orthogonally with respect to the development plane S orthogonally to the insertion direction, has elements or portions of elements on the first face 51 and/or on the second face 52 which are longitudinally proximal to said imaginary development plane S and elements, or portions of elements, which are longitudinally distal from said imaginary development plane S.

According to the present invention, the plate group 5 has a shape such as to have a variable section preferably with a tapered trend in a preferred axial direction. Or, again according to the present invention, the plate group 5 has a shape such as to have a variable section, being centrally concave or convex.

As mentioned, the box 2 (the accommodation region 25 thereof) in particular, the wall 21 and the abutment elements 22 are specially shaped to be engaged by the sealing profiles 510 and the abutment profiles 520.

For example, in an embodiment, with the cartridge 3 comprising a plurality of sealing profiles 510, the wall 21 is specially shaped to comprise sealing planes 210 adapted to be engaged by said sealing profiles 510.

For example, in accordance with a preferred embodiment, the wall 21 comprises a plurality of sealing planes 210 positioned on different imaginary sealing planes T1, T2 which in a direction parallel to the insertion direction Z, with the filtering cartridge 3 accommodated, are in turn at variable longitudinal distances and variable (or respectively different) vertical distances with respect to the imaginary development plane S.

Or again, by way of example, in accordance with a preferred embodiment, the abutment elements 22 are located on different imaginary abutment planes R1, R2, R3, R4, R5, which, with the filtering cartridge 3 accommodated in the box 2, therefore the plate group 5 accommodated in the accommodation region 25, are in turn at variable longitudinal distances and at variable (or respectively different) vertical distances with respect to the imaginary development plane S.

In other words, according to the present invention, the plate group 5 observed laterally has a variable shape along the vertical axis and the plate group 5 observed from above has a variable shape along the longitudinal axis.

Preferably, at least one of the first face 51 and the second face 52 has said variable trend along the vertical axis and at least one of the first face 51 and the second face 52 has said variable trend along the longitudinal axis.

According to a preferred embodiment, the lid 200 can be assembled on the container 20 parallel to the insertion direction Z.

In accordance with a further preferred embodiment, the lid 200 can be assembled on the container 20 in rotation.

In accordance with a preferred embodiment, the lid 200 can be fastened to the container 20 by screw or clip means.

According to a preferred embodiment, the lid 200 is adapted to engage the filtering cartridge 3 in a direction parallel to the insertion direction Z.

Preferably, the lid 200 is adapted to engage the plate group 5 in a direction parallel to the insertion direction.

In other words, the lid 200 is preferably adapted to act as an axial abutment in the insertion direction.

According to a preferred embodiment, the box 2 comprises at least one inflow mouth 28. Preferably, said at least one inflow mouth 28 is longitudinally spaced apart from the at least one outflow mouth 29.

In accordance with a preferred embodiment, the filtering cartridge 3 further comprises an auxiliary plate group 6. Preferably, the auxiliary plate group 6 is longitudinally opposite to the plate group 5. Preferably, the tubular filtering partitions 4 are integrally connected to the auxiliary plate group 6.

Furthermore, according to a preferred embodiment, the end abutment profiles with respect to the at least one central abutment profile are longitudinally farther from the imaginary development plane S.

Or again, according to a preferred embodiment, the end abutment profiles are mutually at different longitudinal distances from the imaginary development plane S.

In addition, according to a preferred embodiment, the end abutment profiles are at different longitudinal distances from each other, but simultaneously at different longitudinal distances also with respect to the at least one central abutment profile.

It should be noted that mixed embodiments can also be included, with respect to those described above, always remaining in accordance with the above described principles of the present invention, having the arrangement of the sealing profiles of one solution and the abutment profiles of the other.

According to a preferred embodiment, the plate group 5 snap-engages the box 2.

According to a preferred embodiment, the plate group 5 snap-engages the container 20.

In accordance with a preferred embodiment, the plate group 5 comprises a tooth 57 adapted to snap-engage a recess 27 present on the box 2. Preferably, the tooth 57 is a flexible element in the transverse direction with respect to the insertion direction Z.

According to an alternative embodiment, the plate group 5 comprises a plurality of teeth 57 adapted to snap-engage the box 2, for example by finding accommodation in specific recesses.

Preferably, said teeth are specially shaped on the abutment profiles.

In accordance with a preferred embodiment, the plate group 5 comprises elastically yielding teeth, adapted to engage the outer end abutment elements 223, preferably in special snap accommodations. Preferably, the snap engagement occurs at the end of insertion of the filtering cartridge 3 into the box 2 in the insertion direction. Preferably, the cartridge is extracted from the box 2 by performing a pulling action which overcomes the elastic action of said elastically yielding teeth.

Preferably, the elastically yielding teeth act in a direction orthogonal to the longitudinal direction X-X.

In accordance with the present invention, described above, further embodiments are possible, for example in a preferred embodiment, the plate group 5 consists of a plurality of distinct components mutually assembled together. For example, in a preferred embodiment, the plate group comprises a first component to which the tubular filtering partitions are operatively connected and which comprises the at least one sealing profile and a second component, which can be assembled to the first, comprising the abutment profiles.

In accordance with a preferred embodiment, the box 2 further comprises support elements adapted to support the auxiliary plate group 6.

Innovatively, the air filtration assembly and the engine air supply system of a vehicle which comprises it, as described above, widely fulfill the purpose of the present invention, overcoming the typical problems of the prior art.

Advantageously, the air filtration assembly effectively exploits the spaces available inside the vehicle, in particular in the engine compartment, so as to have compact dimensions and have adequate filtering surfaces.

Advantageously, the offset positioning between the tubular filtering partitions belonging to the same row allows an optimization of the spaces in the filtration chamber.

Advantageously, the offset positioning between tubular filtering partitions belonging to the same row allows to increase the flexibility available for the sizing of the filtration assembly, for example by increasing the spaces available for positioning the abutment profiles and consequently improving the distribution uniformity of the thrust forces applied on the plate group of the filtering cartridge.

Advantageously, the filtering cartridge can be installed inside the box by means of a guide/positioning system which can be executed and maneuvered in small spaces with, for example, vertical insertion or lateral insertion.

Advantageously, the positioning guide system is very compact, thus allowing to improve the exploitation of the spaces inside the box, increasing the usable filtering surface and reducing the pressure drops imposed on the suction circuit by the filtering cartridge.

Advantageously, the air filtration assembly ensures a simple and intuitive assembly and a simple and intuitive disassembly. Advantageously, the assembly and disassembly operations of the air filtration assembly are guided and foolproof.

Advantageously, the filtering cartridge is insertable in the box according to a single insertion direction, facilitating the conduct of the maintenance procedure.

Advantageously, the filtering cartridge, but in particular the plate group thereof, is insertable in a guided manner in the box, in particular in the accommodation region so as to avoid damage or wear of the sealing profiles, minimizing the friction thereof with the wall and unwanted sliding.

Advantageously, the maintenance operations are guided and overcome the possibility that unwanted breakages occur in the performance thereof.

Advantageously, the positioning of the filtering cartridge ensures a safe and precise positioning of the sealing profiles, and therefore a stable, reliable sealed coupling which is resistant to vibrations and impacts.

Advantageously, the thrust action undergone by the sealing profile (or by the sealing profiles) against the wall is obtained by means of a longitudinal component and by means of a transversal component such as to uniformly distribute the thrust action on the plate group.

Advantageously, the abutment elements and the abutment profiles are mutually interacting so as to favor the engagement of the sealing profile (or of the sealing profiles). Advantageously, the abutment elements and the abutment profiles are specially structured to exert a uniform thrust/ compression of the sealing profile (or of the sealing profiles). Preferably, advantageously, the abutment elements and abutment profiles perform an effective thrust action also in a central region of the plate group.

Advantageously, the abutment elements and the abutment profiles are mutually interacting so as to ensure an adequate tightening of the sealing profile (or of the sealing profiles) along the entire length of the plate group, even in the case of cartridges having a plurality of tubular partitions organized in several rows, and therefore of greater size and weight than in the case of cartridges with two tubular filtering partitions.

Advantageously, the filtering cartridge stably maintains the watertight coupling by exploiting the limited chain of tolerances involved, optimizing the number of components required and therefore the production costs associated with the filtering cartridge.

Advantageously, the filtering cartridge is automatically objectified by virtue of the particular shape of the plate group, facilitating the correct insertion thereof inside the box and offering the operator an immediate visual recognition system.

Advantageously, in order to function effectively, the air filtration assembly requires original filtering cartridges specially shaped to operate with the box, thus also addressing the issue of non-original filtering cartridges.

Advantageously, the rigid connection obtained between the filtering cartridge and the box, in particular between the plate group and the accommodation region, allows a safe and solid engagement, as well as a safe and solid seal between the parts. Advantageously, the box inside the vehicle can be positioned in any relative position without affecting the filtration methods.

It is clear that a person skilled in the art, in order to satisfy contingent requirements, may make changes to the air filtration assembly described above, all included within the scope of protection as defined by the following claims.

REFERENCE NUMERAL LIST 1 air filtration assembly
2 box
20 container
21 wall
210 sealing plane
200 lid
22 abutment elements
220 central abutment element
221 container abutment half-element
222 lid abutment half-element
223 end abutment element
25 accommodation region
27 tooth accommodation recess
28 inflow mouth
29 outflow mouth
3 filtering cartridge
4 tubular filtering partitions
40 inner cavity
5 plate group

14

50 plate body
51 first face, sealing face
510 sealing profile
52 second face, abutment face
520 abutment profile
522 central abutment profile
5221 first portion
5222 second portion
523 end abutment profile
523', 223', 5221', 221', 5222', 222' abutment and thrust surface
57 tooth
59 outflow opening
6 auxiliary plate group
X-X longitudinal axis
V-V first axis, vertical axis
Y-Y second axis, transverse axis
F-F filter axis
Z insertion direction
S imaginary development plane
T1, T2 imaginary sealing plane
R1, R2, R3, R4, R5 imaginary abutment plane
dx1, dx1', dx21', dx21", dx221', dx222', dx221", dx222", dx221''', dx222''' variable longitudinal distance
dz1, dz1', dz2, dz2', dz2", dz2''', dz2'''', dz2''''' variable vertical distance
Df, Df1, Df2 filter diameter
P projection

What is claimed is:

1. An air filtration assembly of a vehicle, comprising:
a box comprising a wall extending along a first axis and a second axis and comprising at least one outflow mouth through which air flows, wherein the box further comprises a longitudinal axis incident to the first axis and the second axis; and
a filtering cartridge comprising:
at least two tubular filtering partitions radially crossable during filtration, wherein each tubular filtering partition extends along a filter axis; and
a plate group to which the at least two tubular filtering partitions are operatively connected, wherein the plate group extends with respect to an imaginary development plane and, at opposite sides of said imaginary development plane, the plate group comprises a first face comprising at least one sealing profile and a second face comprising at least two abutment profiles, the plate group further comprising at least one outflow opening suitable for putting the at least two tubular filtering partitions in fluid communication with the at least one outflow mouth;
wherein the filtering cartridge is insertable into the box along an insertion direction substantially parallel to the first axis or the second axis;
wherein the box further comprises an accommodation region between the wall and at least two abutment elements longitudinally spaced apart from the wall and mutually axially spaced apart, wherein the plate group is housed in said accommodation region with the at least one sealing profile sealingly engaged with the wall and the at least two abutment profiles engaged with the respective abutment elements;
wherein the at least one sealing profile and/or the at least two abutment profiles are shaped or are mutually positioned with respect to the imaginary development plane having vertical variable distances therefrom, measured in a direction orthogonal to the insertion direction, along said insertion direction; and wherein the at least one sealing profile and/or the at least two abutment profiles are shaped or are mutually positioned with respect to the imaginary development plane having longitudinal variable distances therefrom, measured in a direction parallel to the longitudinal axis, along the first axis or the second axis;

wherein the at least two tubular filtering partitions are positioned defining a main extension row along the first axis or the second axis; and wherein two tubular filtering partitions belonging to a same row and proximal to each other have the respective filter axes mutually offset, along both the first axis and the second axis.

2. The air filtration assembly of claim 1, wherein each tubular filtering partition has a filter diameter, wherein the two tubular filtering partitions belonging to the same row and proximal to each other define a projection on the first axis and/or the second axis which is lower than a sum of the respective filter diameters.

3. The air filtration assembly of claim 1, wherein the filtering cartridge comprises at least a third tubular filtering partition belonging to the same row, wherein the filter axis of said third tubular filtering partition is mutually aligned with the filter axis of one of the two tubular filtering partitions offset along the first axis or the second axis, in particular along an axis incident to the insertion direction.

4. The air filtration assembly of claim 1, wherein the plate group comprises at least three abutment profiles comprising two end abutment profiles and at least one central abutment profile positioned between the two end abutment profiles and between two proximal tubular filtering partitions, and wherein the box comprises two end abutment elements and at least one central abutment element.

5. The air filtration assembly of claim 4, wherein the box further comprises a container, in which the filtering cartridge is at least partially housable, and a lid suitable for engaging the container to close the container, wherein the at least one central abutment profile comprises a first portion and a second portion, and wherein the at least one central abutment element comprises a container abutment half-element suitable for engaging the first portion and a lid abutment half-element suitable for engaging the second portion.

6. The air filtration assembly of claim 5, wherein the first portion and the second portion are positioned so as to be mutually offset along the first axis or the second axis.

7. The air filtration assembly of claim 1, wherein the plate group snap-engages the box.

8. The air filtration assembly of claim 7, wherein the plate group comprises a tooth suitable for snap-engaging a recess on the box.

9. The air filtration assembly of claim 1, wherein the at least two abutment profiles and the at least two abutment elements comprise respective abutment and thrust surfaces mutually slidingly engageable during insertion of the cartridge into the box, and wherein the abutment and thrust surfaces are shaped so that the cartridge is pushed and held in position in a longitudinal direction towards the wall.

10. The air filtration assembly of claim 9, wherein the abutment and thrust surfaces are inclined so that the cartridge is pushed and held in position in the longitudinal direction towards the wall.

11. The air filtration assembly of claim 1, wherein the at least two abutment profiles, and in turn the at least two abutment elements, are positioned on different imaginary abutment planes mutually longitudinally spaced apart, each at a respective longitudinal distance from the imaginary development plane.

12. The air filtration assembly of claim 1, wherein the plate group comprises a plurality of outflow openings and respective sealing profiles, each sealing profile extending about the respective outflow opening, identifying a respective sealing region in engagement with the wall.

13. The air filtration assembly of claim 12, wherein the sealing profiles, and in turn respective sealing planes comprised in the wall, are positioned on different imaginary sealing planes mutually longitudinally spaced apart, each at a respective longitudinal distance from the imaginary development plane.

14. The air filtration assembly of claim 1, wherein the at least one outflow opening is shaped such as to extend longitudinally between the second face and the first face to fluidically connect the at least two tubular filtering partitions to the at least one outflow mouth.

15. The air filtration assembly of claim 1, wherein the at least one sealing profile is either an elastically yielding element integrated into the plate group or a removable element.

16. An engine air supply system of a vehicle, comprising the air filtration assembly of claim 1, wherein the box is fluidically connected to an air intake manifold, and the air is drawn in from an external environment through the air filtration assembly.

* * * * *